US011856566B2

(12) United States Patent
Yoo et al.

(10) Patent No.: US 11,856,566 B2
(45) Date of Patent: *Dec. 26, 2023

(54) METHOD AND APPARATUS FOR TRANSMITTING REFERENCE SIGNAL IN WIRELESS COMMUNICATION SYSTEM

(71) Applicant: Samsung Electronics Co., Ltd., Suwon-si (KR)

(72) Inventors: Hyunil Yoo, Suwon-si (KR); Taeyoung Kim, Seoul (KR); Cheolkyu Shin, Suwon-si (KR); Hyungju Nam, Gwangmyeong-si (KR); Jeehwan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,452

(22) Filed: May 9, 2022

(65) Prior Publication Data

US 2022/0264575 A1    Aug. 18, 2022

Related U.S. Application Data

(63) Continuation of application No. 16/822,502, filed on Mar. 18, 2020, now Pat. No. 11,330,590, which is a
(Continued)

(30) Foreign Application Priority Data

Sep. 29, 2017  (KR) .................. 10-2017-0127953
Nov. 14, 2017  (KR) .................. 10-2017-0151594

(51) Int. Cl.
*H04W 72/0453*    (2023.01)
*H04W 72/04*    (2023.01)
(Continued)

(52) U.S. Cl.
CPC ....... *H04W 72/0453* (2013.01); *H04L 5/0048* (2013.01); *H04L 5/0035* (2013.01);
(Continued)

(58) Field of Classification Search
CPC ........... H04W 72/0453; H04W 72/044; H04W 72/0466; H04W 4/70; H04W 84/042;
(Continued)

(56) References Cited

U.S. PATENT DOCUMENTS 8,351,347 B2    1/2013  Noh et al.
8,948,088 B2    2/2015  Noh et al.
(Continued)

FOREIGN PATENT DOCUMENTS

CN    102461015 A    5/2012
CN    102484877 A    5/2012
(Continued)

OTHER PUBLICATIONS

Chinese Office Action dated Sep. 5, 2022, issued in a counterpart Chinese Application No. 201880062945.2.
(Continued)

*Primary Examiner* — Phong La
(74) *Attorney, Agent, or Firm* — Jefferson IP Law, LLP

(57) ABSTRACT

A communication method and a system for converging a fifth generation (5G) communication system for supporting higher data rates beyond a fourth generation (4G) system with an internet of things (IoT) technology are provided, which may be applied to intelligent services based on the 5G communication technology and the IoT-related technology, such as smart home, smart building, smart city, smart car, connected car, health care, digital education, smart retail, security and safety services. A method and an apparatus for transmitting a reference signal are provided. The method includes receiving, from a base station, a first parameter and
(Continued)

a second parameter associated with a sound reference signal (SRS) by higher layer signaling, identifying a bandwidth for the SRS based on the first parameter and the second parameter, and transmitting, to the base station, the SRS based on the identified bandwidth for the SRS.

16 Claims, 14 Drawing Sheets

Related U.S. Application Data continuation of application No. 16/148,545, filed on Oct. 1, 2018, now Pat. No. 10,602,518.

(51) Int. Cl.
*H04L 5/00* (2006.01)
*H04W 4/70* (2018.01)
*H04W 84/04* (2009.01)

(52) U.S. Cl.
CPC .............. *H04L 5/0051* (2013.01); *H04W 4/70* (2018.02); *H04W 84/042* (2013.01)

(58) Field of Classification Search
CPC ... H04L 5/0048; H04L 5/0051; H04L 5/0053; H04L 5/0058; H04L 5/0042; H04L 5/0032; H04L 5/0037; H04L 5/0035
See application file for complete search history.

(56) References Cited

U.S. PATENT DOCUMENTS

| | | |
|---|---|---|
| 9,288,020 B2 | 3/2016 | Papasakellariou et al. |
| 9,680,613 B2 | 6/2017 | Noh et al. |
| 2011/0090862 A1 | 4/2011 | Liang et al. |
| 2012/0044906 A1 | 2/2012 | Chen et al. |
| 2012/0063426 A1 | 3/2012 | Noh et al. |
| 2012/0076037 A1 | 3/2012 | Noh et al. |
| 2012/0113967 A1 | 5/2012 | Smith et al. |
| 2013/0163537 A1 | 6/2013 | Anderson et al. |
| 2014/0056278 A1 | 2/2014 | Marinier et al. |
| 2014/0185530 A1 | 7/2014 | Kuchibhotla et al. |
| 2014/0187283 A1 | 7/2014 | Nimbalker et al. |
| 2014/0269460 A1* | 9/2014 | Papasakellariou .... H04L 5/0048 370/294 |
| 2015/0036509 A1 | 2/2015 | Lopes et al. |
| 2015/0351119 A1 | 12/2015 | Song et al. |
| 2015/0358998 A1 | 12/2015 | Golitschek Edler Von Elbwart et al. |
| 2017/0048717 A1 | 2/2017 | Yoo et al. |
| 2017/0366311 A1 | 12/2017 | Iyer et al. |
| 2019/0044598 A1 | 2/2019 | Talarico et al. |
| 2019/0052505 A1 | 2/2019 | Baldemair et al. |
| 2019/0097874 A1* | 3/2019 | Zhou ..................... H04W 76/28 |
| 2019/0173644 A1* | 6/2019 | Lyu ....................... H04W 24/08 |
| 2020/0244503 A1 | 7/2020 | Bala et al. |
| 2020/0280421 A1* | 9/2020 | Choi ..................... H04L 5/0048 |

FOREIGN PATENT DOCUMENTS

| | | |
|---|---|---|
| CN | 102577522 A | 7/2012 |
| WO | 2016-107286 A1 | 7/2016 |

OTHER PUBLICATIONS

Huawei et al.,"SRS transmission for eLAA", R1-160301, 3GPP TSG RAN WG1 Meeting #84, St. Julian's, Malta, Feb. 6, 2016 See sections 2-3. Feb. 6, 2016.
3GPP; TSG RAN; "Evolved Universal Terrestrial Radio Access (E-UTRA); Physical layer procedures (Release 14)", 3GPP TS 36.213 V14.4.0, 26; 650 Route des Lucioles—Sophia Antipolis Valbonne—France; Sep. 26, 2017 See section 8.2.
International Search Report dated Jan. 11, 2019; International Application #: PCT/KR2018/011653.
Extended European Search Report dated Jul. 17, 2020, issued in a counterpart European 18860053.1-1205/3673606.
"3rd Generation Partnership Project; Technical Specification Group Radio Access Network; Evolved Universal Terrestrial Radio Access (E-UTRA); Physical channels and modulation (Release 14)", 3GPP Standard; Technical Specification; 3GPP TS 36.211, 3rd Generation Partnership Project (3GPP), vol. RAN WG1, No. V14.4.0; XP051337329, pp. 8-75; Sep. 26, 2017.
Korean Office Action dated Jan. 24, 2022, issued in a counterpart Korean Application No. 10-2017-0151594.
Samsung; SRS design for NR; 3GPP TSG RAN WG1 Meeting NR#3, R1-1715969; Sep. 12, 2017, Nagoya, Japan.
Huawei, HiSilicon; UL SRS design for beam management and CSI acquisition; 3GPP TSG RAN WG1 NR Ad Hoc Meeting, R1-1715474; Sep. 8, 2017, Nagoya, Japan.

* cited by examiner

FIG. 1A

Table 5.5.3.2-1: $m_{SRS,b}$ and $N_b$, b=0,1,2,3, values for the uplink bandwidth of $6 \leq N_{RB}^{UL} \leq 40$

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 5.5.3.2-2: $m_{SRS,b}$ and $N_b$, b=0,1,2,3, values for the uplink bandwidth of $40 < N_{RB}^{UL} \leq 60$

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

FIG. 1B

Table 5.5.3.2-3: $m_{SRS,b}$ and $N_b$, b=0,1,2,3, values for the uplink bandwidth of $60 < N_{RB}^{UL} \leq 80$

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 5.5.3.2-4: $m_{SRS,b}$ and $N_b$, b=0,1,2,3, values for the uplink bandwidth of $80 < N_{RB}^{UL} \leq 110$

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

FIG. 2

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 20 | 1 | 4 | 5 | 4 | 1 | 4 | 1 |
| 5 | 24 | 1 | 4 | 6 | 4 | 1 | 4 | 1 |
| 6 | 32 | 1 | 16 | 2 | 8 | 2 | 4 | 2 |
| 7 | 36 | 1 | 12 | 3 | 4 | 3 | 4 | 1 |
| 8 | 40 | 1 | 20 | 2 | 4 | 5 | 4 | 1 |
| 9 | 48 | 1 | 24 | 2 | 12 | 2 | 4 | 3 |
| 10 | 48 | 1 | 16 | 3 | 8 | 2 | 4 | 2 |
| 11 | 60 | 1 | 20 | 3 | 4 | 5 | 4 | 1 |
| 12 | 64 | 1 | 32 | 2 | 16 | 2 | 4 | 4 |
| 13 | 72 | 1 | 36 | 2 | 12 | 3 | 4 | 3 |
| 14 | 80 | 1 | 40 | 2 | 20 | 2 | 4 | 5 |
| 15 | 96 | 1 | 32 | 3 | 16 | 2 | 4 | 4 |
| 16 | 96 | 1 | 48 | 2 | 24 | 2 | 4 | 5 |
| 17 | 108 | 1 | 36 | 3 | 12 | 3 | 4 | 3 |
| 18 | 120 | 1 | 60 | 2 | 20 | 3 | 4 | 5 |
| 19 | 128 | 1 | 64 | 2 | 16 | 4 | 4 | 4 |
| 20 | 144 | 1 | 48 | 3 | 16 | 3 | 4 | 4 |
| 21 | 160 | 1 | 80 | 2 | 20 | 4 | 4 | 5 |
| 22 | 192 | 1 | 96 | 2 | 24 | 4 | 4 | 6 |
| 23 | 192 | 1 | 64 | 3 | 16 | 4 | 4 | 4 |
| 24 | 216 | 1 | 108 | 2 | 36 | 3 | 4 | 9 |
| 25 | 240 | 1 | 120 | 2 | 40 | 3 | 4 | 10 |
| 26 | 240 | 1 | 80 | 3 | 20 | 4 | 4 | 5 |
| 27 | 256 | 1 | 128 | 2 | 32 | 4 | 4 | 8 |
| 28 | 272 | 1 | 136 | 2 | 44 | 4 | 4 | 11 |
| 29 | | | | | | | | |
| 30 | | | | | | | | |
| 31 | | | | | | | | |

FIG. 10A

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |

FIG. 10B

| 36 | 144 | 1 | 48  | 3  | 24 | 2  | 12 | 2  |
|----|-----|---|-----|----|----|----|----|----|
| 37 | 144 | 1 | 48  | 3  | 16 | 3  | 4  | 4  |
| 38 | 144 | 1 | 16  | 9  | 8  | 2  | 4  | 2  |
| 39 | 152 | 1 | 76  | 2  | 4  | 19 | 4  | 1  |
| 40 | 160 | 1 | 80  | 2  | 40 | 2  | 4  | 10 |
| 41 | 160 | 1 | 80  | 2  | 20 | 4  | 4  | 5  |
| 42 | 160 | 1 | 32  | 5  | 16 | 2  | 4  | 4  |
| 43 | 168 | 1 | 84  | 2  | 28 | 3  | 4  | 7  |
| 44 | 176 | 1 | 88  | 2  | 44 | 2  | 4  | 11 |
| 45 | 184 | 1 | 92  | 2  | 4  | 23 | 4  | 1  |
| 46 | 192 | 1 | 96  | 2  | 48 | 2  | 4  | 12 |
| 47 | 192 | 1 | 96  | 2  | 24 | 4  | 4  | 6  |
| 48 | 192 | 1 | 64  | 3  | 16 | 4  | 4  | 4  |
| 49 | 192 | 1 | 24  | 8  | 8  | 3  | 4  | 2  |
| 50 | 208 | 1 | 104 | 2  | 52 | 2  | 4  | 13 |
| 51 | 216 | 1 | 108 | 2  | 36 | 3  | 4  | 9  |
| 52 | 224 | 1 | 112 | 2  | 56 | 2  | 4  | 14 |
| 53 | 240 | 1 | 120 | 2  | 60 | 2  | 4  | 15 |
| 54 | 240 | 1 | 80  | 3  | 20 | 4  | 4  | 5  |
| 55 | 240 | 1 | 48  | 5  | 16 | 3  | 8  | 2  |
| 56 | 240 | 1 | 24  | 10 | 12 | 2  | 4  | 3  |
| 57 | 256 | 1 | 128 | 2  | 64 | 2  | 4  | 16 |
| 58 | 256 | 1 | 128 | 2  | 32 | 4  | 4  | 8  |
| 59 | 256 | 1 | 16  | 16 | 8  | 2  | 4  | 2  |
| 60 | 264 | 1 | 132 | 2  | 44 | 3  | 4  | 11 |
| 61 | 272 | 1 | 136 | 2  | 68 | 2  | 4  | 17 |
| 62 | 272 | 1 | 68  | 4  | 4  | 17 | 4  | 1  |
| 63 | 272 | 1 | 16  | 17 | 8  | 2  | 4  | 2  |

METHOD AND APPARATUS FOR TRANSMITTING REFERENCE SIGNAL IN WIRELESS COMMUNICATION SYSTEM

CROSS-REFERENCE TO RELATED APPLICATION(S)

This application is a continuation application of prior application Ser. No. 16/822,502, filed on Mar. 18, 2020, which will be issued as U.S. Pat. No. 11,330,590 on May 10, 2022; which is a continuation application of prior application Ser. No. 16/148,545, filed on Oct. 1, 2018, which has been issued as U.S. Pat. No. 10,602,518 on Mar. 24, 2020, and was based on and claimed priority under 35 U.S.C. § 119 of a Korean patent application number 10-2017-0127953, filed on Sep. 29, 2017, in the Korean Intellectual Property Office, and of a Korean patent application number 10-2017-0151594, filed on Nov. 14, 2017, in the Korean Intellectual Property Office, the disclosure of each of which is incorporated by reference herein in its entirety.

BACKGROUND

1. Field

The disclosure relates to reference signal transmission in a mobile communication system. More particularly, the disclosure relates to a transmission method using multiple antennas in a mobile communication system.

The disclosure further relates to reference signal transmission in a mobile communication system, and more particularly to a method and an apparatus for a user equipment (UE) to transmit a sounding reference signal (SRS) for channel state measurement.

2. Description of Related Art

In order to meet the demand for wireless data traffic that is on an increasing trend after commercialization of fourth generation (4G) communication systems, efforts have been made to develop improved fifth generation (5G) or pre-5G communication system. For this reason, the 5G or pre-5G communication system is also called a beyond 4G network communication system or a post long-term evolution (LTE) system. In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive multiple input multiple output (MIMO), full dimension MIMO (FD-MIMO), array antennas, analog beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid frequency shift keying (FSK) and quadrature amplitude modulation (QAM) modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and machine type communication (MTC) have been implemented by techniques for beam-forming, MIMO, and array antennas, which correspond to the 5G communication technology. As the big data processing technology as described above, application of a cloud radio access network (cloud RAN) would be an example of convergence between the 5G technology and the IoT technology.

On the other hand, since 5G communication is operated using the bandwidth part concept, it is necessary to design a new SRS bandwidth for the 5G communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method using a reference signal.

Another aspect of the disclosure is to provide a method for transmitting a user equipment (UE)-specific sounding reference signal (SRS) in consideration of a UE bandwidth part.

Another aspect of the disclosure is to provide a method for defining an SRS bandwidth for supporting the SRS bandwidth extended to 272 RB.

Another aspect of the disclosure is to provide a method for adding an SRS bandwidth to a radio resource control (RRC) message for configuration for each UE in consideration of a UE-supportable bandwidth.

Another aspect of the disclosure is to provide a method for configuring a reference for a frequency position of an SRS using at least one of a UE bandwidth part (BWP) reference and a system bandwidth reference.

Additional aspects will be set forth in part in the description which follows and, in part, will be apparent from the description, or may be learned by practice of the presented embodiments.

In accordance with an aspect of the disclosure, a method of a user equipment (UE) in a wireless communication system is provided. The method includes receiving, from a base station, a first parameter and a second parameter associated with a sound reference signal (SRS) by higher layer signaling, identifying a bandwidth for the SRS based on the first parameter and the second parameter, and transmitting, to the base station, the SRS based on the identified bandwidth for the SRS, wherein the first parameter and the second parameter include UE-specific parameters.

In accordance with another aspect of the disclosure, a method of a base station in a wireless communication system is provided. The method includes transmitting, to a user equipment (UE), a first parameter and a second parameter associated with a sound reference signal (SRS) by higher layer signaling; and receiving, from the UE, the SRS based on a bandwidth for the SRS, the bandwidth being identified based on the first parameter and the second parameter, wherein the first parameter and the second parameter include UE-specific parameters.

In accordance with another aspect of the disclosure, a user equipment (UE) in a wireless communication system is provided. The UE includes a transceiver and at least one processor operably connected to the transceiver and configured to receive, from a base station, a first parameter and a second parameter associated with a sound reference signal (SRS) by higher layer signaling, identify a bandwidth for the SRS based on the first parameter and the second parameter, and transmit, to the base station, the SRS based on the identified bandwidth for the SRS, wherein the first parameter and the second parameter include UE-specific parameters.

In accordance with another aspect of the disclosure, a base station in a wireless communication system is provided. The base station includes a transceiver, and at least one processor operably connected to the transceiver and configured to transmit, to a user equipment (UE), a first parameter and a second parameter by higher layer signaling, and receive, from the UE, the SRS based on a bandwidth for the SRS, the bandwidth being identified based on the first parameter and the second parameter, wherein the first parameter and the second parameter include UE-specific parameters.

The technical subject matters to be achieved by the disclosure are not limited to those as described above, and unmentioned or other technical subject matters will be clearly understood by those of ordinary skill in the art to which the disclosure pertains from the following description.

According to the aspects of the disclosure, it is possible to provide a method and an apparatus using a reference signal.

Further, according to the aspects of the disclosure, it is possible to allocate and transmit an SRS resource to in a UE-specific manner in case of transmitting the SRS in consideration of a bandwidth part. Further, according to the aspects of the disclosure, unlike LTE, it is possible to consider a UE bandwidth and a bandwidth in a bandwidth part without considering the system bandwidth.

Further, according to the aspects of the disclosure, the UE can receive the SRS bandwidth (BW) and the UE SRS BW from the base station through UE-specific signaling, receive the frequency position for transmitting the SRS, and transmit the SRS to the base station.

Further, according to the aspects of the disclosure, it is possible to determine the frequency position for transmitting the SRS based on frequency information having an absolute value based on the system bandwidth.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 1A and 1B are diagrams explaining a method for configuring a cell-specific sounding reference signal (SRS) parameter for SRS frequency resource configuration and an SRS bandwidth through SRS bandwidth configuration ($C_{SRS}$) in long-term evolution (LTE) according to various embodiments of the disclosure;

FIG. 2 is a diagram illustrating an SRS bandwidth table according to an embodiment of the disclosure;

FIGS. 10A and 10B are diagrams illustrating another embodiment in which an SRS bandwidth is extended up to 272 resource blocks (RB) based on tables illustrated in FIGS. 1A and 1B according to various embodiments of the disclosure.

Throughout the drawings, it should be noted that like reference numbers are used to depict the same or similar elements, features, and structures.

DETAILED DESCRIPTION

Figure 3:
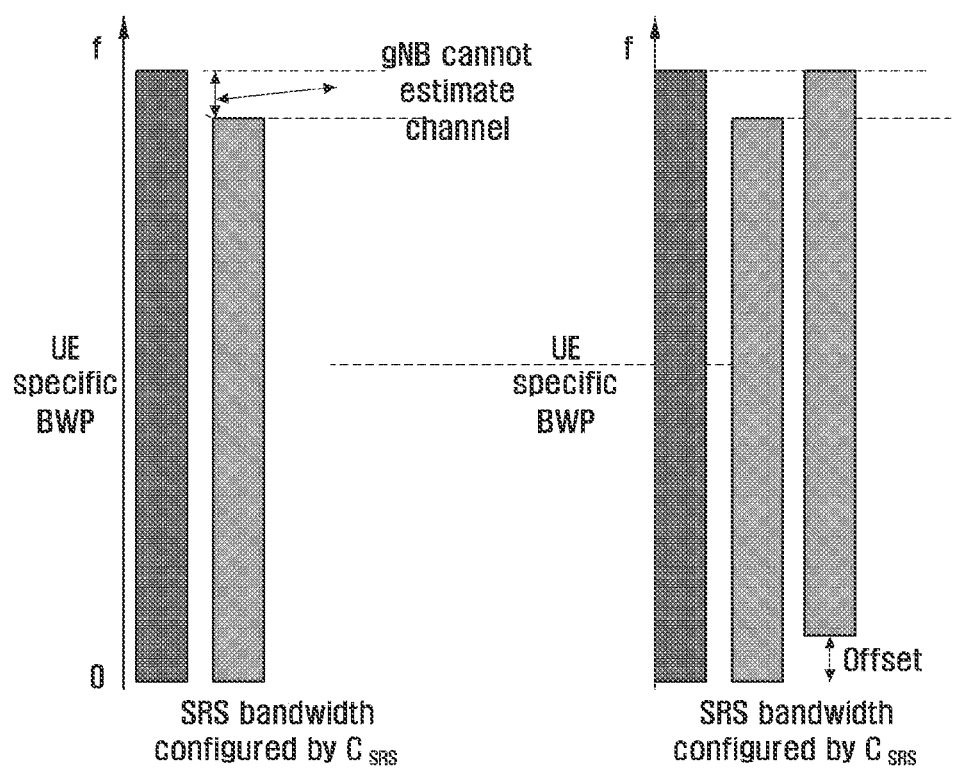
FIG. 3 is a diagram explaining a problem caused by quantized SRS bandwidth support according to an embodiment of the disclosure.

The following description with reference to the accompanying drawings is provided to assist in a comprehensive understanding of various embodiments of the disclosure as defined the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In explaining embodiments of the disclosure, explanation of technical contents which are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in an embodiment, means, but is not limited to, a software or hardware component, such as field programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card.

Beamforming is a technology capable of expecting reduction of unnecessary signal interferences by extending a transmission distance through concentration of an arrival area of radio waves in a specific direction using two or more array antennas and by simultaneously reducing levels of signals received in directions excluding the corresponding concentrated direction. In case of applying the beamforming technology, it can be expected to increase service areas and to reduce interference signals. However, for this, it is necessary to match a beam direction between a base station and a user equipment (UE) in order to form an optimum beam. That is, it is required to seek the beam direction having the optimum beam strength.

In case of a downlink, a periodic synchronization signal or a UE-specific channel state information-reference signal (CSI-RS) may be used as a training signal for the beamforming. The CSI-RS has been used as a downlink beam training signal in a full dimension multiple input multiple output (FD-MIMO).

However, in case of an uplink, a training signal for this has not been defined. As an uplink beam training signal, a random access channel (RACH), a sounding reference signal (SRS), or a UL demodulation reference signal (UL DMRS) may be considered. However, among the above signals, the RACH and the UL DMRS do not have periodicity.

In case of the SRS, an SRS subframe that is actually transmitted by a UE is designated and transmitted through cell-specific SRS configuration and UE-specific SRS configuration in long-term evolution (LTE). Next, a method for transmitting an SRS in LTE will be described in detail.

In LTE, cell-specific configuration for frequency configuration has been defined as follows.

FIGS. 1A and 1B are diagrams explaining a method for configuring a cell-specific SRS parameter for SRS frequency resource configuration and an SRS bandwidth through $C_{SRS}$ in LTE according to various embodiments of the disclosure.

Referring to FIGS. 1A and 1B, one of four tables is selected in accordance with an uplink bandwidth, and in the selected table, an SRS bandwidth is determined in accordance with a $C_{SRS}$ value. Accordingly, all UEs in a cell are allocated with the same SRS bandwidth, and transmit an SRS within the allocated SRS bandwidth.

However, in 5G communication, an operation is performed using the bandwidth part concept. The bandwidth part is the concept that if the UE capability cannot support the system bandwidth in the system bandwidth, a bandwidth that the UE can support can be configured and operated as the bandwidth part. For example, if the bandwidth that the UE can support is 10 MHz and the system bandwidth is 100 MHz, the bandwidth is configured as a value that is smaller than 10 MHz that is the bandwidth that the UE can support, and the operation is performed therein. Accordingly, since the SRS is also unable to support the SRS bandwidth in accordance with the cell-specific configuration, the $C_{SRS}$ is transmitted to respective UEs through the UE-specific configuration, and the respective UEs are allocated with different SRS bandwidths to be operated. Accordingly, it is required to design new SRS bandwidths for the 5G communication. In order to design new SRS bandwidth allocation, the following matters should be considered. In FIGS. 1A and 1B, $B_{SRS}$ indicates UE-specific SRS bandwidth. That is, in case of $B_{SRS}=0$, the UE transmits wideband SRS, and in case of $B_{SRS}=3$, the UE transmits narrow-band SRS. In case of the SRS bandwidth that is wider than that in LTE (e.g., 272 RB), it is required to determine up to how many $B_{SRS}$ should be considered. Support of too small $B_{SRS}$ may cause insufficient granularity between the wideband SRS transmission and the narrow-band SRS transmission. Since the UE-specific SRS bandwidth supported by the $B_{SRS}$ should be made as a multiple of the SRS bandwidth in the minimum unit, four kinds of $B_{SRS}$ may be considered in the same manner as the LTE. Further, it is preferable to design a table supporting from the minimum bandwidth (BW) to the maximum BW without defining a table in accordance with four kinds of uplink bandwidths as in the LTE, and to support the SRS bandwidth in accordance with UE capability.

FIG. 2 is a diagram illustrating an SRS bandwidth table according to an embodiment of the disclosure.

Referring to FIG. 2, an SRS bandwidth table is disclosed, which can support the SRS bandwidth that is unrelated to the UL bandwidth while supporting the SRS bandwidth that is wider than that in LTE. As illustrated in FIG. 2, a UE previously shares UL bandwidth information that can be supported by the UE with a base station, and based on this, the base station allocates $C_{SRS}$ and $B_{SRS}$ to the UE in a UE-specific manner. In accordance with the $C_{SRS}$ and the $B_{SRS}$, the UE generates an SRS as long as the corresponding length, and performs wideband SRS or narrow-band SRS transmission.

The table of FIG. 2 has been made to extend up to 272 RB based on the table of FIGS. 1A and 1B. A new design is necessary for entries exceeding 96 RB. As illustrated in FIG. 2, the entries exceeding 96 RB have been designed for the following background. Each entry of $B_{SRS}$ of each $C_{SRS}$ has a multiple of 4. This is because an SRS resource is made as a multiple of 4 RB. Further, values corresponding to $m_{srs}$ and n of ($B_{SRS}=n$) should be selected as values that can be expressed as multiplication of $N_{n+1}$ and ($m_{srs,n+1}$) of ($B_{SRS}=n+1$). Here, exceptionally, 272 RB may be configured to include entries including values that are not included in the entries that are smaller than 272 RB.

In a scenario where a 5G system and LTE coexist, the following SRS bandwidth can be configured. All UEs in a cell may be allocated with cell-specific SRS bandwidths illustrated in FIGS. 1A and 1B through a system information block (SIB). Here, if necessary, the UEs that operate the UE-specific BW in consideration of the bandwidth part may update the SRS bandwidth through reception of the values illustrated in FIG. 2 through UE-specific signaling.

In case of operating the SRS bandwidth based on the table of FIG. 2, signaling overhead can be reduced since all possible UE-specific BWs are not supported. However, as quantization is performed based on the table, a problem that the whole UE BW is unable to be sounded may occur.

FIG. 3 is a diagram explaining a problem caused by quantized SRS bandwidth support according to an embodiment of the disclosure.

Referring to FIG. 3, a BW in accordance with UE capability may differ from a BW in a bandwidth part (BWP) allocated by a base station. That is, the BW in the BWP is unable to be larger than the BW in accordance with the UE capability. FIG. 3 shows a method for sounding the whole band while supporting the quantized SRS bandwidth. The left figure in FIG. 3 shows a problem that the whole band channels are unable to be estimated due to the difference between the UE-specific B W and the SRS bandwidth allocated to the $C_{SRS}$. Since the base station performs downlink/uplink scheduling of the UE based on the channels estimated through the SRS, it is very important to transmit the SRS through the whole band. In order to solve this problem, the base station can transmit information for adjusting the frequency position of the SRS to the UE through the UE-specific signaling (downlink control indicator (DCI)/media access control (MAC) control element (CE)/radio resource control (RRC) signaling).

A first method for adjusting the frequency position of the SRS is a method for transmitting the SRS so that the base station allocates a specific offset to the UE and the UE can cover all the bands that cannot be previously sounded by the UE as illustrated in FIG. 3.

Figure 4:
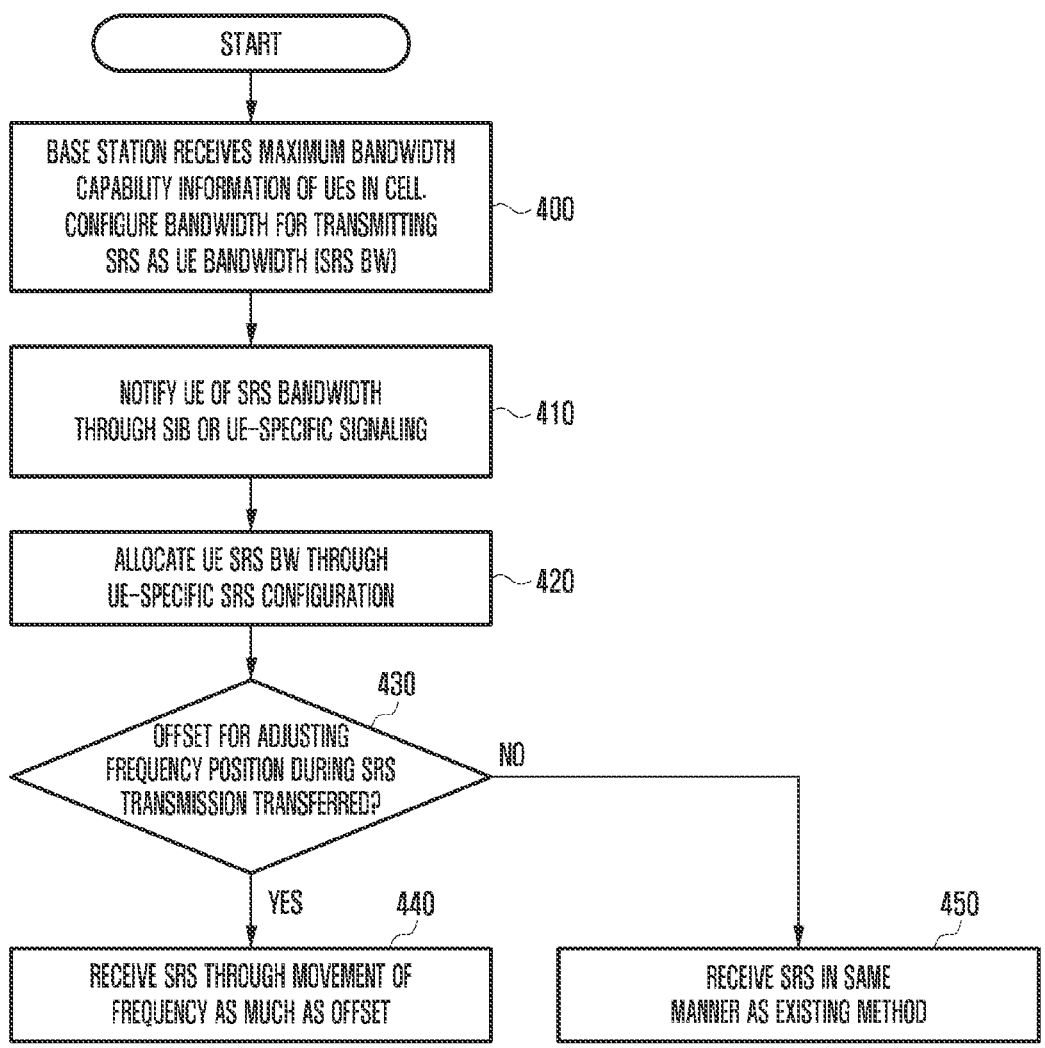
FIG. 4 is a diagram illustrating an operation of a base station according to an embodiment of the disclosure.
Figure 5:
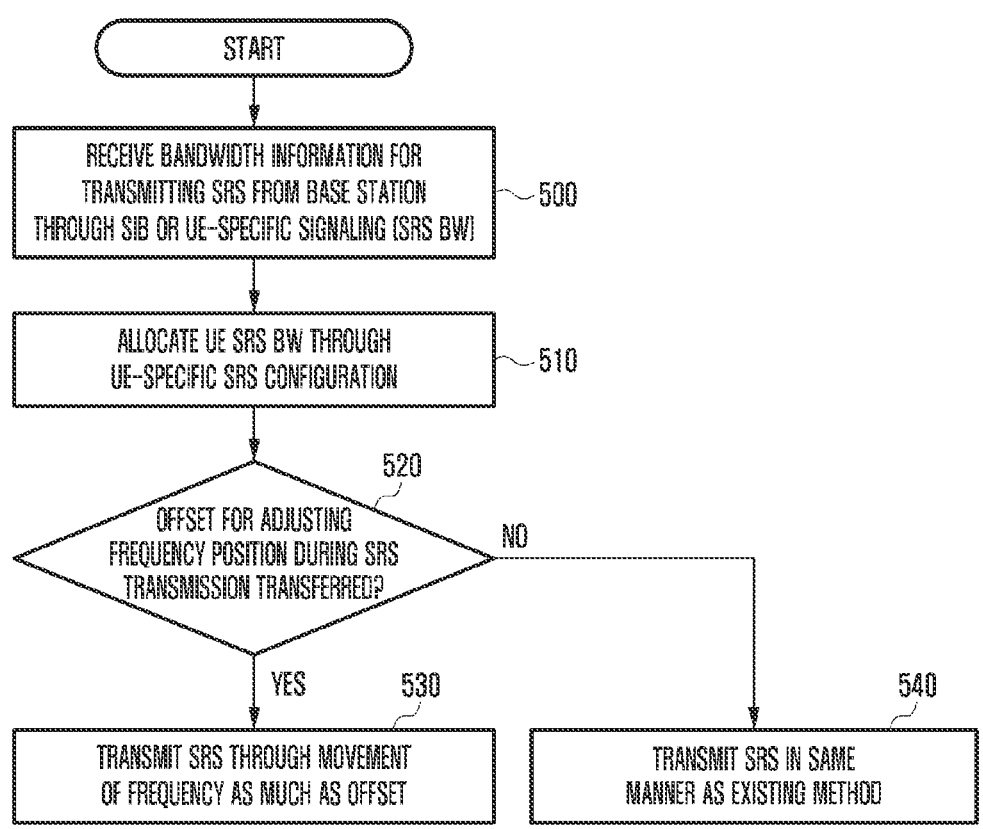
FIG. 5 is a diagram illustrating an operation of a user equipment (UE) according to an embodiment of the disclosure.

FIGS. 4 and 5 are diagrams illustrating operations of a base station and a UE for transmitting an SRS using an offset according to various embodiments of the disclosure.

FIG. 4 is a diagram illustrating an operation of a base station according to an embodiment of the disclosure. Referring to FIG. 4, the base station changes an SRS transmission frequency position using an offset and receives an SRS based on the changed SRS transmission frequency.

Referring to FIG. 4, at operation 400, the base station may receive bandwidth capability information of UEs in a cell. That is, the UE notifies the base station of the bandwidth information that can be supported by the UE. Base on this, the base station may configure a bandwidth-in-bandwidth part, and may configure an SRS bandwidth (SRS BW) for transmitting the SRS based on this. At operation 410, the base station may notify the UE of the configured SRS BW through the SIB or UE-specific signaling (RRC/MAC CE or DCI). At operation 420, the base station may allocate a UE SRS BW for the UE to actually transmit the SRS through UE-specific SRS configuration. At operation 430, the base station may determine whether an offset value for adjusting the frequency position has been transferred to the UE when the UE transmits the SRS. For example, the offset value may be included in the RRC configuration that is transmitted to the UE at operations 410 and 420. Accordingly, if the UE receives the SRS configuration that includes the corresponding offset value, it may generate the SRS in consideration of the offset from the time when it generates the SRS. Further, separately from the RRC configuration, the base station may transmit the offset to the UE using DCI/MAC CE. Accordingly, the UE may generate the SRS through the RRC configuration, and during an actual transmission, it may determine whether to reflect the offset value from the DCI/MAC CE. At operation 430, if the base station transfers the offset value that is not 0 to the UE in accordance with the determination of whether to transfer the offset value to the UE, it may receive the SRS transmitted by the UE through movement of the frequency as much as the offset value at operation 440, whereas if the base station does not transfer the offset value or allocates "0" as the offset value, it may receive the SRS in the same manner as the existing method at operation 450.

FIG. 5 is a diagram illustrating an operation of a UE according to an embodiment of the disclosure. Referring to FIG. 5, the UE changes an SRS transmission frequency position using an offset and transmits an SRS based on the changed SRS transmission frequency.

Referring to FIG. 5, at operation 500, the UE may receive the SRS BW from a base station through SIB or UE-specific signaling (RRC, DCI, or MAC CE). At operation 510, the UE may be allocated with the UE SRS BW from the base station through the UE-specific SRS configuration. At operation 520, the UE may identify whether an offset value for adjusting the frequency position has been transferred from the base station when the UE transmits the SRS. The offset value may be included in the RRC configuration that is transmitted by the base station at operation 500 or 510. Accordingly, if the UE receives the SRS configuration that includes the corresponding offset value from the base station, the UE may generate the SRS in consideration of the offset value from the time when the UE generates the SRS. Further, separately from the RRC configuration, the UE may estimate the offset value using DCI/MAC CE transmitted from the base station. Accordingly, the UE may generate the SRS through the RRC configuration of the SRS, and during an actual transmission, it may determine whether to reflect the offset value from the DCI/MAC CE. At operation 520, if the UE estimates the transferred offset value as an offset value that is not 0, it may transmit the SRS through movement of the frequency as much as the offset value at operation 530. Here, the offset value may be configured in the unit of Hz, RB, or RE. If the offset value is not transferred or is allocated as "0" at operation 520, the UE, at operation 540, transmits the SRS in the same manner as the existing method without applying the offset value.

A second method for adjusting the frequency position of the SRS is a method in which the base station notifies the UE of start and end positions for the UE to transmit the SRS. The base station may notify the UE of the start and end positions for the UE to transmit the SRS using a physical index based on the system bandwidth. Further, the base station may notify the UE of the start and end positions for the UE to transmit the SRS using a logical RB index in the UE BW. As described above, the start and end positions for transmitting the SRS may be notified to the UE through the UE-specific signaling (DCI/MAC CE/RRC signaling).

Figure 6:
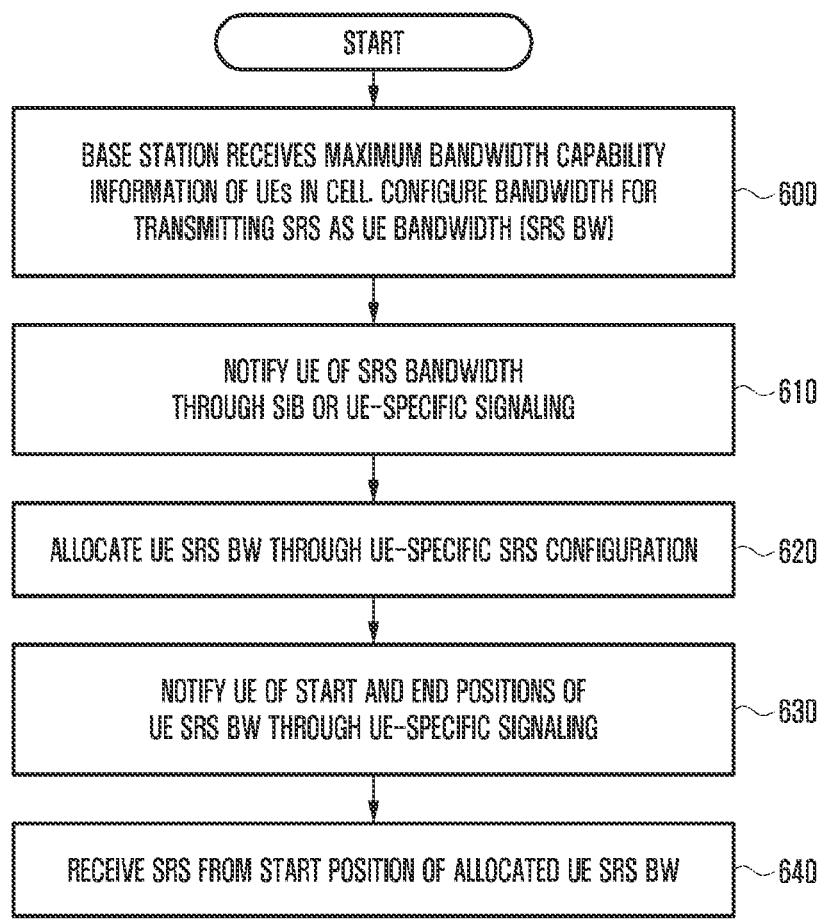
FIG. 6 is a diagram illustrating an operation of a base station for a second method for adjusting a frequency position of an SRS according to an embodiment of the disclosure.

FIG. 6 is a diagram illustrating an operation of a base station for a second method for adjusting a frequency position of an SRS according to an embodiment of the disclosure. Referring to FIG. 6, the base station notifies the UE of start and end positions of the frequency for transmitting the SRS.

Referring to FIG. 6, at operation 600, the base station may receive bandwidth capability information of UEs in a cell. That is, the UE notifies the base station of the bandwidth information that can be supported by the UE. Base on this, the base station may configure a bandwidth-in-bandwidth part, and may configure an SRS bandwidth (SRS BW) for transmitting the SRS based on this. At operation 610, the base station may notify the UE of the configured SRS BW through the SIB or UE-specific signaling (RRC/MAC CE or DCI). At operation 620, the base station may allocate a UE SRS BW for the UE to actually transmit the SRS through UE-specific SRS configuration. At operation 630, the base station may notify the UE of start and end positions through UE-specific signaling so as to change the SRS transmission position of the UE. Here, the start and end positions for the UE to transmit the SRS may be expressed as Hz, RE index, or RB index. At operation 640, the base station may receive the SRS transmitted by the UE from the start and end positions of the UE SRS BW allocated to the UE.

Figure 7:
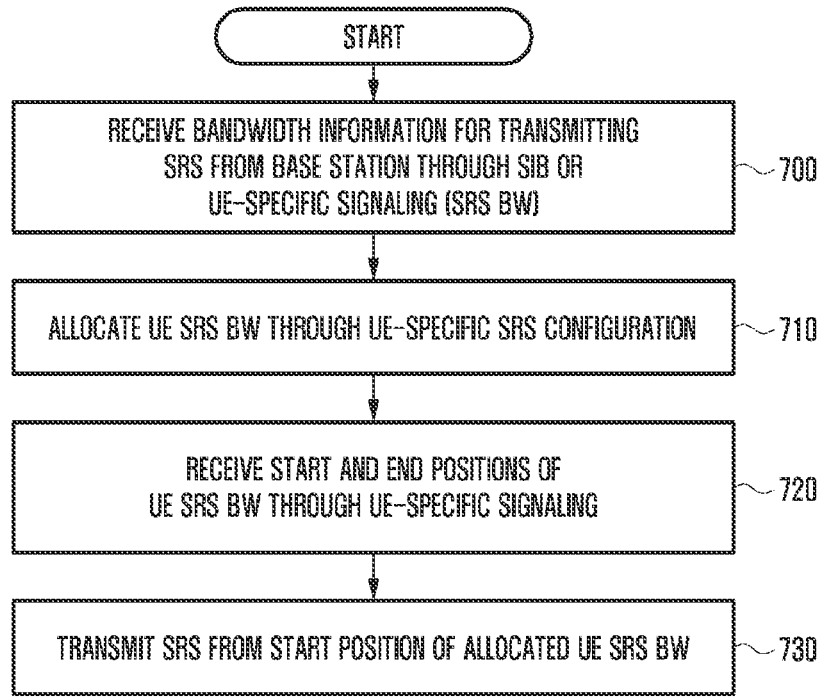
FIG. 7 is a diagram illustrating an operation of a UE for a second method for adjusting a frequency position of an SRS according to an embodiment of the disclosure.

FIG. 7 is a diagram illustrating an operation of a UE for a second method for adjusting a frequency position of an SRS according to an embodiment of the disclosure. Referring to FIG. 7, the UE transmits an SRS based on start and end position information of the frequency for transmitting the SRS.

Referring to FIG. 7, at operation 700, the UE may receive an SRS BW from a base station through SIB or UE-specific signaling (RRC, DCI, or MAC CE). At operation 710, the UE may be allocated with a UE SRS BW from the base station through UE-specific SRS configuration. At operation 720, the UE may be allocated with the frequency position for the UE to transmit the SRS from the base station. The UE may be allocated with a start frequency position, an end position, or start and end positions for the UE to transmit the SRS from the base station through the UE-specific signaling. Such frequency information may be an absolute value based on physical PRB index 0 based on the system bandwidth. That is, based on the physical PRB index 0, Hz, RE index, or RB index may be allocated. Further, start and end values may be allocated based on the UE BW. That is, based on the UE BW RB index 0, Hz unit, RE, or RB index may be allocated. At operation 730, the UE transmits the SRS based on the allocated start and end positions of the SRS.

The embodiments of FIGS. 4 and 6 can be embodied in combination, and it is also possible to combine partial operations of the embodiments of FIGS. 5 and 7.

Figure 8:
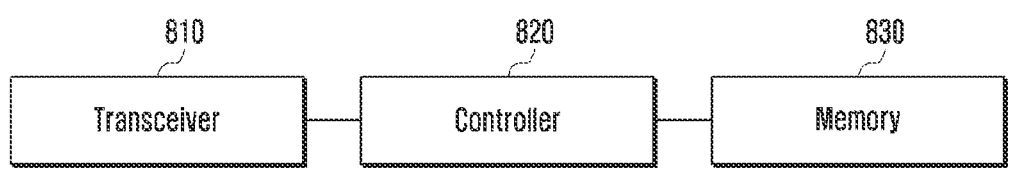
FIG. 8 is a diagram illustrating the structure of a base station according to an embodiment of the disclosure.

FIG. 8 is a diagram illustrating the structure of a base station according to an embodiment of the disclosure.

Referring to FIG. 8, the base station may include a transceiver 810, a controller 820 (e.g., at least one processor), and a storage 830 (e.g., a memory). In an embodiment of the disclosure, the controller 820 may be defined as a circuit, an application-specific integrated circuit, or at least one processor. The transceiver 810 may transmit and receive signals with other network entities. The controller 820 may control the overall operation of the base station according to an embodiment proposed in the disclosure. The storage 830 may store at least one of information transmitted and received through the transceiver 810 and information generated through the controller 820.

Figure 9:
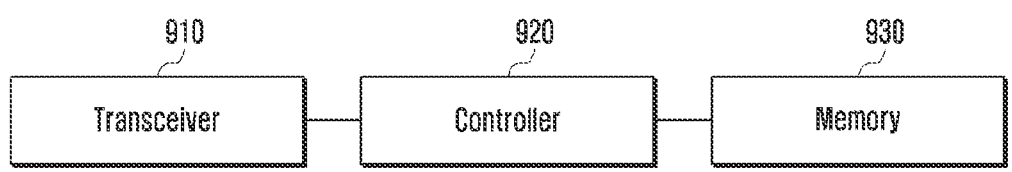
FIG. 9 is a diagram illustrating the structure of a UE according to an embodiment of the disclosure.

FIG. 9 is a diagram illustrating the structure of a UE according to an embodiment of the disclosure.

Referring to FIG. 9, the terminal may include a transceiver 910, a controller 920 (e.g., at least one processor), and a storage 930 (e.g., a memory). In an embodiment of the disclosure, the controller 920 may be defined as a circuit, an application-specific integrated circuit, or at least one processor. The transceiver 910 may transmit and receive signals with other network entities. The controller 920 may control the overall operation of the terminal according to an embodiment proposed in the disclosure. The storage 930 may store at least one of information transmitted and received through the transceiver 910 and information generated through the controller 920.

FIGS. 10A and 10B are diagrams illustrating another embodiment in which an SRS bandwidth is extended up to 272 RB based on tables illustrated in FIGS. 1A and 1B according to various embodiments of the disclosure.

Referring to FIGS. 10A and 10B, in the same manner as the table illustrated in FIG. 2, a new design is necessary for entries exceeding 96 RB. The entries exceeding 96 RB have been designed for the following background. Each entry of $B_{SRS}$ of each $C_{SRS}$ has a multiple of 4. This is because an SRS resource is made as a multiple of 4 RB. In the last column $B_{SRS}=3$, 4 RB that is the minimum unit of SRS allocation is supported. Further, as the first feature of a network structure, values corresponding to $m_{srs}$ and n of ($B_{SRS}=n$) should be selected as values that can be expressed as multiplication of $N_{n+1}$ and ($m_{srs,n+1}$) of ($B_{SRS}=n+1$). Further, in case of supporting 96 RB or more, it is configured to have a network structure using the existing entries (96 RB or less). For example, in order to support 120 RB, 60 RB that is a half thereof is supported, and support of 60 RB is configured as defined in configuration index 11. Through this, the base station can minimize complexity of SRS detection when supporting a plurality of entries. As described above, the values using the network structure applied as elements in a new entry are selected through the reuse of the values in the existing entries among the entries having the values that is equal to or larger than 96 RB and equal to or smaller than 272 RB, and the selected values are applied to SRS bandwidth configuration ($31^{st}$, $37^{th}$, $47^{th}$, $48^{th}$, $54^{th}$, and $58^{th}$ indexes). Here, exceptionally, 272 RB may be configured to include the entries including the values that are not included in the entries that are smaller than 272 RB. Further, it is possible to support RB that is smaller than the RB supported by the bandwidth part and is a multiple of 4 that is the largest value ($20^{th}$, $33^{rd}$, $51^{st}$, and $60^{th}$ indexes). Through this, it is possible to estimate the SRS bandwidth that is closest to the bandwidth part. Further, it is possible to include the entries that can be divided by a multiple of 4 with respect to Bsrs=1,2,3 in consideration of the entries including a multiple of 8 and a multiple of 16. FIG. 2 as described above is featured to include the entries having the characteristics of the network structure/the support of the bandwidth of the bandwidth part/Bsrs=0 having a multiple of 8 or 16 and Bsrs=1,2,3 having a multiple of 4.

Figure 11:
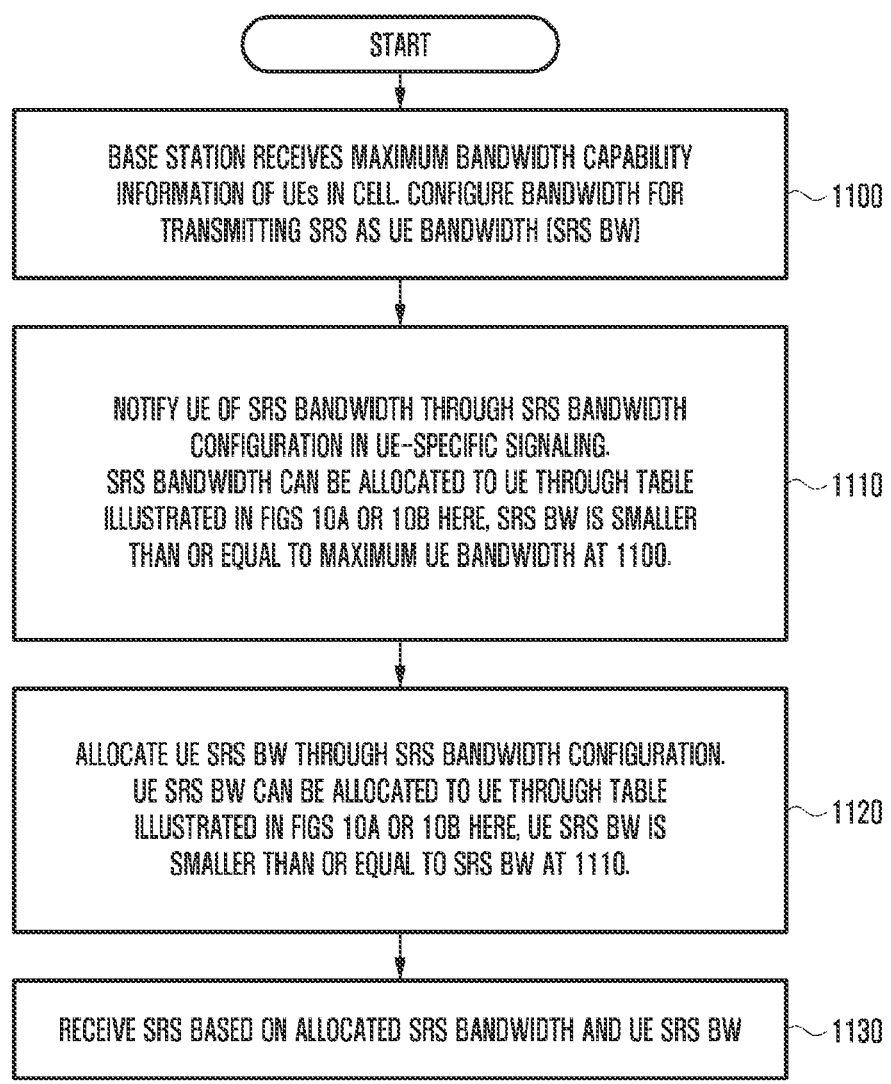
FIGS. 11 and 12 are diagrams illustrating processes of a base station and a UE to allocate an SRS using the table illustrated in FIGS. 10A and 10B and to transmit and receive the allocated SRS according to various embodiments of the disclosure.
Figure 12:
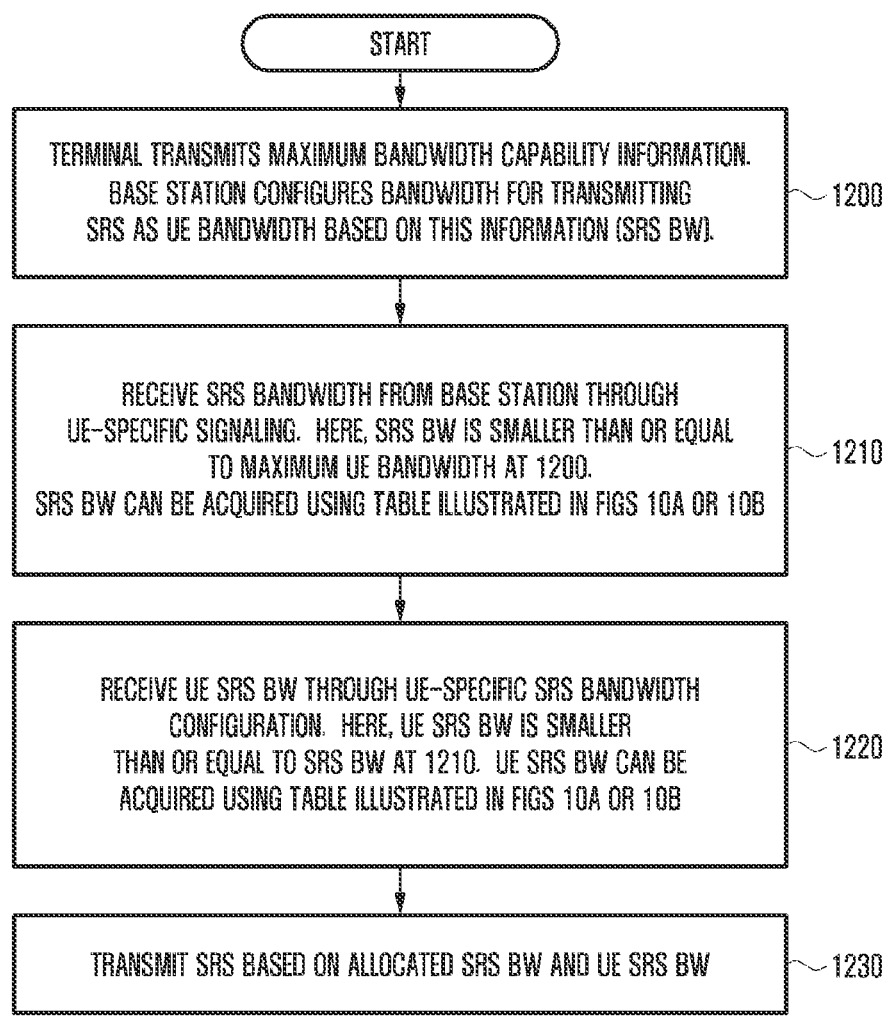

FIGS. 11 and 12 are diagrams illustrating processes of a base station and a UE to allocate an SRS using the table illustrated in FIGS. 10A and 10B, and to transmit and receive the allocated SRS according to various embodiments of the disclosure.

Referring to FIGS. 11 and 12, the base station may receive maximum bandwidth capability information of UEs in a cell, and may configure a bandwidth for transmitting an SRS at operation 1100.

The configured SRS bandwidth (SRS BW) may be configures as an index of an SRS bandwidth configuration ($C_{SRS}$) in the table of FIGS. 10A and 10B at operation 1110. Here, the SRS BW may be smaller than or equal to the bandwidth that can be supported by the UE.

The base station may notify the UE of the UE SRS BW for notifying the length of the SRS transmitted at a time by the UE using the table illustrated in FIGS. 10A and 10B at operation 1120. If the UE SRS BW is equal to the SRS BW, the UE may transmit a periodic SRS once, whereas if the UE SRS BW is smaller than the SRS BW, the UE may transmit the SRS several times. For example, if the SRS BW is set to 120 RB, and the UE SRS BW is set to 40 RB, the UE that transmits the periodic SRS can transmit the SRS three times through frequency hopping, and thus the base station is required to receive the SRS corresponding to this.

The base station can receive the SRS based on the allocated SRS bandwidth and the UE SRS BW at operation 1130.

Referring to FIG. 12, the UE may transmit bandwidth information that can be supported by the UE in order for the base station to configure the SRS BW at operation 1200. Based on this information, the base station may configure a UE-specific SRS BW in consideration of the bandwidth part.

The UE may receive the SRS bandwidth from the base station at operation 1210. The SRS BW may be smaller than or equal to the maximum UE bandwidth at operation 1200. The SRS BW may be acquired using the $C_{SRS}$ of the table illustrated in FIGS. 10A and 10B.

The UE may receive the UE SRS BW through the SRS bandwidth configuration at operation 1220. Here, the UE SRS BW may be smaller than or equal to the SRS BW at operation 1210. The UE SRS BW may also be acquired through the table illustrated in FIGS. 10A and 10B.

The UE may transmit the SRS based on the allocated SRS BW and the UE SRS BW at operation 1230.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a base station, a configuration associated with a sound reference signal (SRS) including a first parameter, a second parameter and an offset parameter by higher layer signaling;
   identifying a bandwidth for the SRS based on the first parameter and the second parameter included in the configuration;
   identifying a starting point for the bandwidth based on the offset parameter included in the configuration; and
   transmitting, to the base station, the SRS based on the identified bandwidth for the SRS and the identified starting point,
   wherein the first parameter indicates UE-specific SRS bandwidth, the second parameter indicates an SRS bandwidth configuration, and the offset parameter indicates transmission comb offset.

2. The method of claim 1, wherein the bandwidth for the SRS includes up to 272 resource blocks (RB).

3. The method of claim 1,
   wherein a first value of the first parameter indicates a first bandwidth set not including 272 resource blocks (RB) and a second value of the first parameter indicates a second bandwidth set including 272 RB in a predetermined table, and
   wherein the first bandwidth set does not include a part of the second bandwidth set less than 272 RB.

4. The method of claim 3, wherein the predetermined table comprises:

| C_SRS | B_SRS = 0 | | B_SRS = 1 | | B_SRS = 2 | | B_SRS = 3 | |
|---|---|---|---|---|---|---|---|---|
| | mSRS,0 | N0 | mSRS,1 | N1 | mSRS,2 | N2 | mSRS,3 | N3 |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

5. A method performed by a base station in a wireless communication system, the method comprising:

transmitting, to a user equipment (UE), a configuration associated with a sound reference signal (SRS) including a first parameter, a second parameter and an offset parameter by higher layer signaling; and receiving, from the UE, the SRS based on a bandwidth for the SRS and a starting point for the bandwidth, wherein the bandwidth is identified based on the first parameter and the second parameter included in the configuration, wherein the starting point for the bandwidth is identified based on the offset parameter included in the configuration, and wherein the first parameter indicates UE-specific SRS bandwidth, the second parameter indicates an SRS bandwidth configuration, and the offset parameter indicates transmission comb offset.

6. The method of claim 5, wherein the bandwidth for the SRS includes up to 272 resource blocks (RB).

7. The method of claim 5,
wherein a first value of the first parameter indicates a first bandwidth set not including 272 resource blocks (RB) and a second value of the first parameter indicates a second bandwidth set including 272 RB in a predetermined table, and wherein the first bandwidth set does not include a part of the second bandwidth set less than 272 RB.

8. The method of claim 7, wherein the predetermined table comprises:

| C_SRS | B_SRS = 0 | | B_SRS = 1 | | B_SRS = 2 | | B_SRS = 3 | |
|---|---|---|---|---|---|---|---|---|
| | m_SRS,0 | N0 | m_SRS,1 | N1 | M_SRS,2 | N2 | m_SRS,3 | N3 |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |

-continued

| $C_{SRS}$ | $B_{SRS}=0$ | | $B_{SRS}=1$ | | $B_{SRS}=2$ | | $B_{SRS}=3$ | |
| | $m_{SRS,0}$ | $N_0$ | $m_{SRS,1}$ | $N_1$ | $M_{SRS,2}$ | $N_2$ | $m_{SRS,3}$ | $N_3$ |
|---|---|---|---|---|---|---|---|---|
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

9. A user equipment (UE) in a wireless communication system, the UE comprising:
a transceiver; and
at least one processor operably connected to the transceiver and configured to:
control the transceiver to receive, from a base station, a configuration associated with a sound reference signal (SRS) including a first parameter, a second parameter and an offset parameter by higher layer signaling,
identify a bandwidth for the SRS based on the first parameter and the second parameter included in the configuration,
identify a starting point for the bandwidth based on the offset parameter included in the configuration, and
control the transceiver to transmit, to the base station, the SRS based on the identified bandwidth for the SRS and the identified starting point,
wherein the first parameter indicates UE-specific SRS bandwidth, the second parameter indicates an SRS bandwidth configuration, and the offset parameter indicates transmission comb offset.

10. The UE of claim 9, wherein the bandwidth for the SRS includes up to 272 resource blocks (RB).

11. The UE of claim 9,
wherein a first value of the first parameter indicates a first bandwidth set not including 272 resource blocks (RB) and a second value of the first parameter indicates a second bandwidth set including 272 RB in a predetermined table, and
wherein the first bandwidth set does not include a part of the second bandwidth set less than 272 RB.

12. The UE of claim 11, wherein the predetermined table comprises:

| $C_{SRS}$ | $B_{SRS}=0$ | | $B_{SRS}=1$ | | $B_{SRS}=2$ | | $B_{SRS}=3$ | |
| | $m_{SRS,0}$ | $N_0$ | $m_{SRS,1}$ | $N_1$ | $M_{SRS,2}$ | $N_2$ | $m_{SRS,3}$ | $N_3$ |
|---|---|---|---|---|---|---|---|---|
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |

-continued

| $C_{SRS}$ | $B_{SRS}=0$ | | $B_{SRS}=1$ | | $B_{SRS}=2$ | | $B_{SRS}=3$ | |
| | $m_{SRS,0}$ | $N_0$ | $m_{SRS,1}$ | $N_1$ | $M_{SRS,2}$ | $N_2$ | $m_{SRS,3}$ | $N_3$ |
|---|---|---|---|---|---|---|---|---|
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

13. A base station in a wireless communication system, the base station comprising:
a transceiver; and
at least one processor operably connected to the transceiver and configured to control the transceiver to:
transmit, to a user equipment (UE), a configuration associated with a sound reference signal (SRS) including a first parameter, a second parameter and an offset parameter by higher layer signaling, and
receive, from the UE, the SRS based on a bandwidth for the SRS and a starting point for the bandwidth, wherein the bandwidth is identified based on the first parameter and the second parameter included in the configuration, wherein the starting point for the bandwidth is identified based on the offset parameter included in the configuration, and wherein the first parameter indicates UE-specific SRS bandwidth, the second parameter indicates an SRS bandwidth configuration, and the offset parameter indicates transmission comb offset.

14. The base station of claim 13, wherein the bandwidth for the SRS includes up to 272 resource blocks (RB).

15. The base station of claim 13, wherein a first value of the first parameter indicates a first bandwidth set not including 272 resource blocks (RB) and a second value of the first parameter indicates a second bandwidth set including 272 RB in a predetermined table, and wherein the first bandwidth set does not include a part of the second bandwidth set less than 272 RB.

16. The base station of claim 15, wherein the predetermined table comprises:

| | $B_{SRS}=0$ | | $B_{SRS}=1$ | | $B_{SRS}=2$ | | $B_{SRS}=3$ | |
|---|---|---|---|---|---|---|---|---|
| $C_{SRS}$ | $m_{SRS,0}$ | $N_0$ | $m_{SRS,1}$ | $N_1$ | $M_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

* * * * *